United States Patent
Bauer

(10) Patent No.: US 6,757,595 B1
(45) Date of Patent: Jun. 29, 2004

(54) METHOD TO MITIGATE VEHICLE ROLL OSCILLATIONS BY LIMITING THE RATE OF RECOVERY OF THE LATERAL COMPONENT OF THE TIRE FORCE VECTOR

(75) Inventor: Geoffrey B. Bauer, Northville, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 25 days.

(21) Appl. No.: 10/318,723

(22) Filed: Dec. 13, 2002

(51) Int. Cl.[7] .......................... G06F 17/00; G05D 1/08
(52) U.S. Cl. .................. 701/1; 701/72; 701/37; 340/440; 280/5.507
(58) Field of Search .................. 701/1, 37, 38, 701/72, 80, 91; 340/442, 440, 429; 280/5.507, 5.502

(56) References Cited

U.S. PATENT DOCUMENTS 6,089,680 A * 7/2000 Yoshioka et al. .......... 303/146

2001/0008986 A1   7/2001  Brown et al. .................. 701/1

* cited by examiner

*Primary Examiner*—Tan Q. Nguyen

(57) ABSTRACT

A stability control system and method is provided for decreasing the propensity for rollover and preventing a rapid body roll movement after active management by the stability control system. The control system and method recognizes a propensity for vehicle instability, modifies the tire force vector of the vehicle's wheel to increase stability, and returns the tire force vector at a limited rate to prevent an impulse force on the wheel. The tire force vector may be held for a period of time after the propensity for vehicle instability is no longer recognized. A logic block is provided for determining the propensity for the impulse force on the wheel, which results in control of the proportional control signal or other signal to regulate the control input that is sent to the braking or steering control system.

21 Claims, 4 Drawing Sheets

METHOD TO MITIGATE VEHICLE ROLL OSCILLATIONS BY LIMITING THE RATE OF RECOVERY OF THE LATERAL COMPONENT OF THE TIRE FORCE VECTOR

FIELD OF THE INVENTION

The present invention relates generally to stability control systems for automotive vehicles, and more particularly relates to preventing a rollover propensity in an automotive vehicle.

BACKGROUND OF THE INVENTION

Stability control systems, either for yaw stability or roll stability, detect an instability or potential instability in a vehicle's dynamics and modify the dynamics to ensure stability. Typically, such stability control systems utilize a controller receiving various inputs from sensors such as a yaw rate sensor, a speed sensor (wheel and/or vehicle speed), a lateral acceleration sensor, a roll rate sensor, a steering angle sensor, a longitudinal acceleration sensor, and a pitch rate sensor. The controller may also utilize other inputs, which can be sensed, inferred or estimated.

The stability control system generally acts when the vehicle is performing a dynamic maneuver such as a high speed turn or slalom maneuver. Typically, the controller of the stability control system will send a control input signal to another control system such a brake control system (such as ABS), a powertrain system, or a steering control system (when the vehicle is capable of controlled steering). For example, a particular wheel may be actively braked, its torque reduced, or its steering angle adjusted. One exemplary stability control system is described in U.S. Patent Application Publication US 2001/0008986 A1, the disclosure of which is hereby incorporated by reference in its entirety.

In this way, the stability control system will modify the tire force vector on the selected wheel or wheels to promote vehicle stability. When stability is reached, the stability control system removes the control input, leaving the tire force vector unmodified. Unfortunately, these systems can result in a force being impulsed back into the wheel after modification of the tire force vector. The increase in force on the wheel acts as a subtle trip (as if hitting a small curb), thereby inducing a rapid body roll movement characterized by a high roll rate or momentum. Clearly, this can lead to an increased propensity for rollover.

Accordingly, there exists a need to provide a stability control system and related method which decreases the propensity for rollover and prevents a rapid body roll movement after active management by the stability control system.

BRIEF SUMMARY OF THE INVENTION

The present invention provides a method for controlling stability in a vehicle comprising the steps of recognizing a propensity for vehicle instability, modifying the tire force vector of the vehicle's wheel to increase stability, and returning the tire force vector at a limited rate to prevent an impulse force on the wheel. Generally, the tire force vector is changed from a first unmodified state to a modified state, and then returned to a second unmodified state. The second unmodified state may be identical to the first unmodified state, or may alternately be different based on a change of conditions such as vehicle speed, wheel speed, or tire angle as determined by user inputs. The method may further comprise the step of holding the tire force vector in the modified state when the propensity for vehicle instability is no longer recognized.

The step of modifying the tire force vector is typically based on a proportional control signal, and may also be based on a derivative control signal and a double derivative control signal. For example, in roll stability systems the control signals represent roll angle, roll rate, and roll acceleration, respectively. Alternately, the proportional control signal is a yaw rate error of the vehicle, and the derivative control signal is the derivative of the yaw rate error of the vehicle (i.e. for a yaw stabilizing program). Preferably, the step of returning the tire force vector includes sending an interrupt signal that replaces the proportional control signal. Alternately, the step of returning the tire force vector will include sending an override signal that is summed with the proportional control signal.

The method may further comprise the step of determining a propensity for the impulse force on the wheel. This can be performed to determine whether the limited recovery rate of the tire force vector should be applied. Typically, this determining step of the impulse force is based on wheel speed and yaw rate of the vehicle. Further, other inputs can be utilized to identify when the limited recovery rate should be applied, including brake force, tire lateral force, tire steer angle, roll angle, and roll rate.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1A:
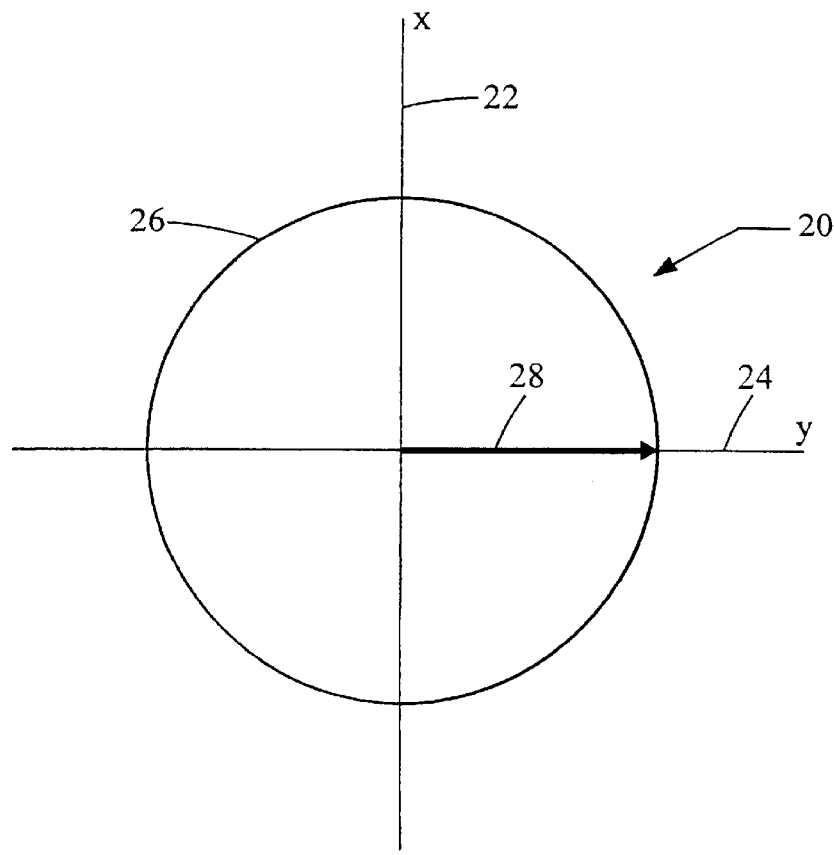
FIGS. 1*a* and 1*b* are schematics depicting the effects on a tire force vector due to brake force application.
Figure 1B:
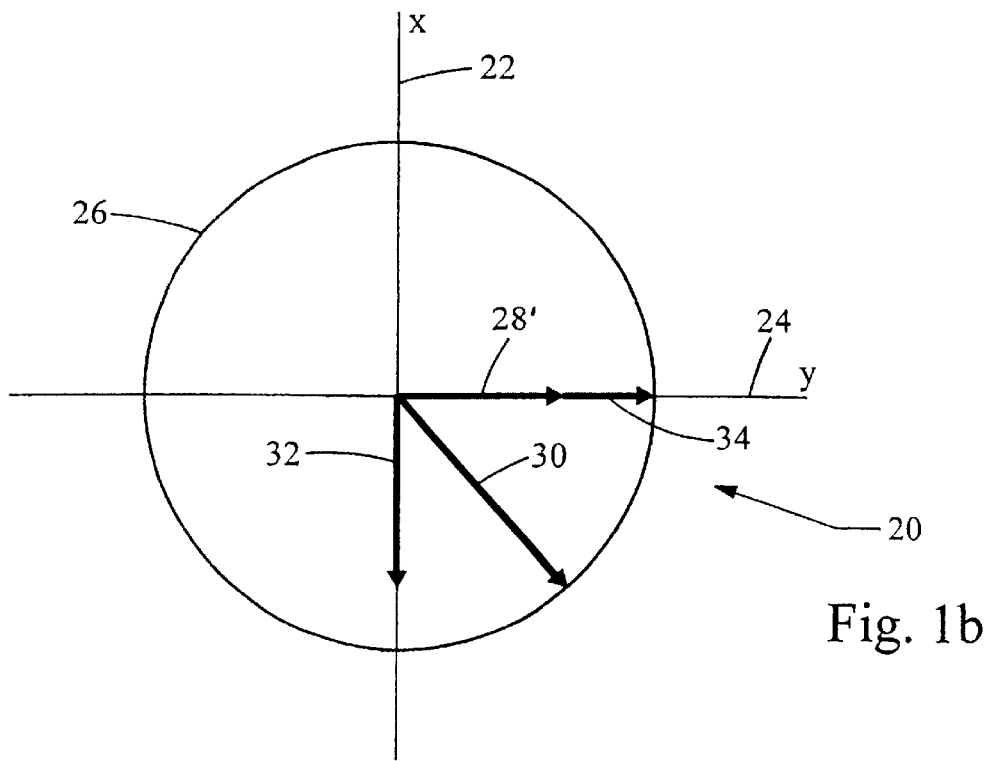

Turning now to the figures, FIGS. 1*a* and 1*b* depict force vector effects due to a torque reduction or brake force application. As described in the background section, a stability control program such as a roll stability program will brake a wheel or reduce drive torque to that wheel in order to increase roll stability. FIG. 1*a* depicts a tire force vector 20 on a wheel during a dynamic maneuver such as a hard turn or slalom maneuver. The circle 26 depicts a friction circle representing the maximum force transferable between the wheel and the ground. The X axis 22 represents the tire's longitudinal axis and the Y axis 24 represents the tire's lateral axis. Arrowed line 28 represents the lateral force $F_{y\_unmodified}$ on the wheel and is directed along the Y axis 24.

FIG. 1b shows a modification of the force vector when a braking force or torque reduction is applied. Arrowed line 30 represents the total force on the wheel, which is a combination of the braking force depicted by arrowed line 32, and the lateral force $F_{y\_modified}$ depicted by arrowed line 28'. It can be seen that $F_{y\_unmodified}$ 28 has been reduced to $F_{y\_modified}$ 28', resulting in a reduction of lateral force denoted by arrowed line 34 and referred to herein as $F_{y*}$. It is the return of this lateral force $F_{y*}$ that is the subject of the present invention.

Figure 2A:
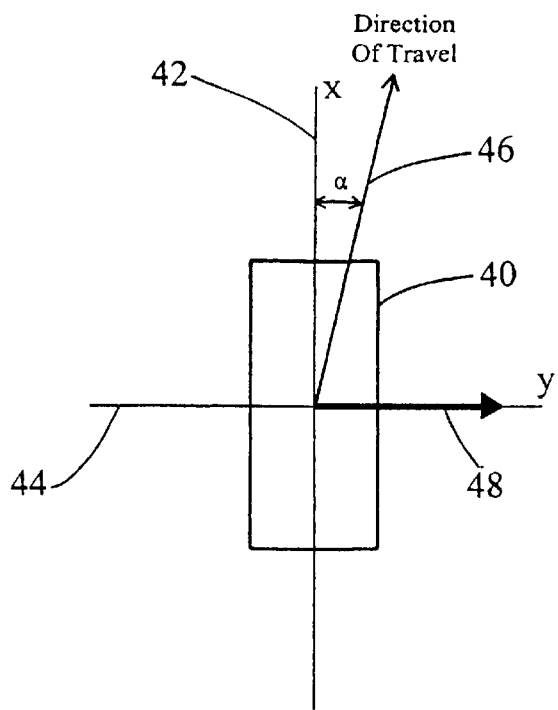
FIGS. 2*a* and 2*b* are schematics depicting the effects on a tire force vector due to steering angle application.
Figure 2B:
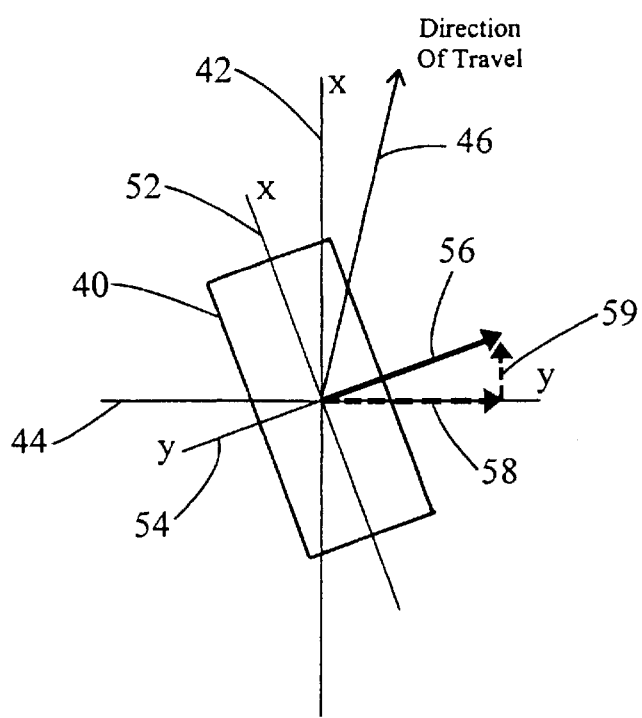

Turning now to FIGS. 2a and 2b, the tire force vector effects on a wheel 40 have been depicted. It can be seen that the X-axis of the wheel 40 is aligned with the vehicle X axis 42. The vehicle Y axis 44 is also aligned with the Y axis of the tire 40. As shown herein, the wheel 40 represents a rear tire in a dynamic maneuver which could lead to yaw instability, such as understeer. It will be understood that a stability control program may also act on the tire angle of a front wheel. Accordingly, the wheel 40 has a slip angle a representing the difference between the longitudinal axis 42 and the direction of travel denoted by line 46. It can be seen that the wheel 40 has a lateral force $F_{y\_modified}$ acting along the Y axis 44 as denoted by arrowed line 48.

FIG. 2b depicts the situation where the stability control program, such as a yaw stability program or even a roll stability program, has modified the tire angle as represented by the tire X axis 52 and tire Y axis 54 which are no longer aligned with the vehicle X axis 42 or the vehicle Y axis 44. Due to the tire angle change shown in FIG. 2b, the wheel 40 now has a modified lateral force $F_{y\_modified}$ as denoted by arrowed line 56. Since the tire's 40 lateral axis 54 is no longer aligned with the vehicle's lateral axis 44, $F_{y\_modified}$ will be slightly less than $F_{y\_modified}$. That is, $F_{y\_modified}$ is comprised of a force 58 (denoted herein as $F_y'$) and a longitudinal force 59 (denoted herein as $F_x'$). In this situation, $F_y'$ 58 will be slightly less than $F_{y\_modified}$. A reduction in lateral force, denoted herein as $F_{y*}$ is the topic of the present invention.

Figure 3:
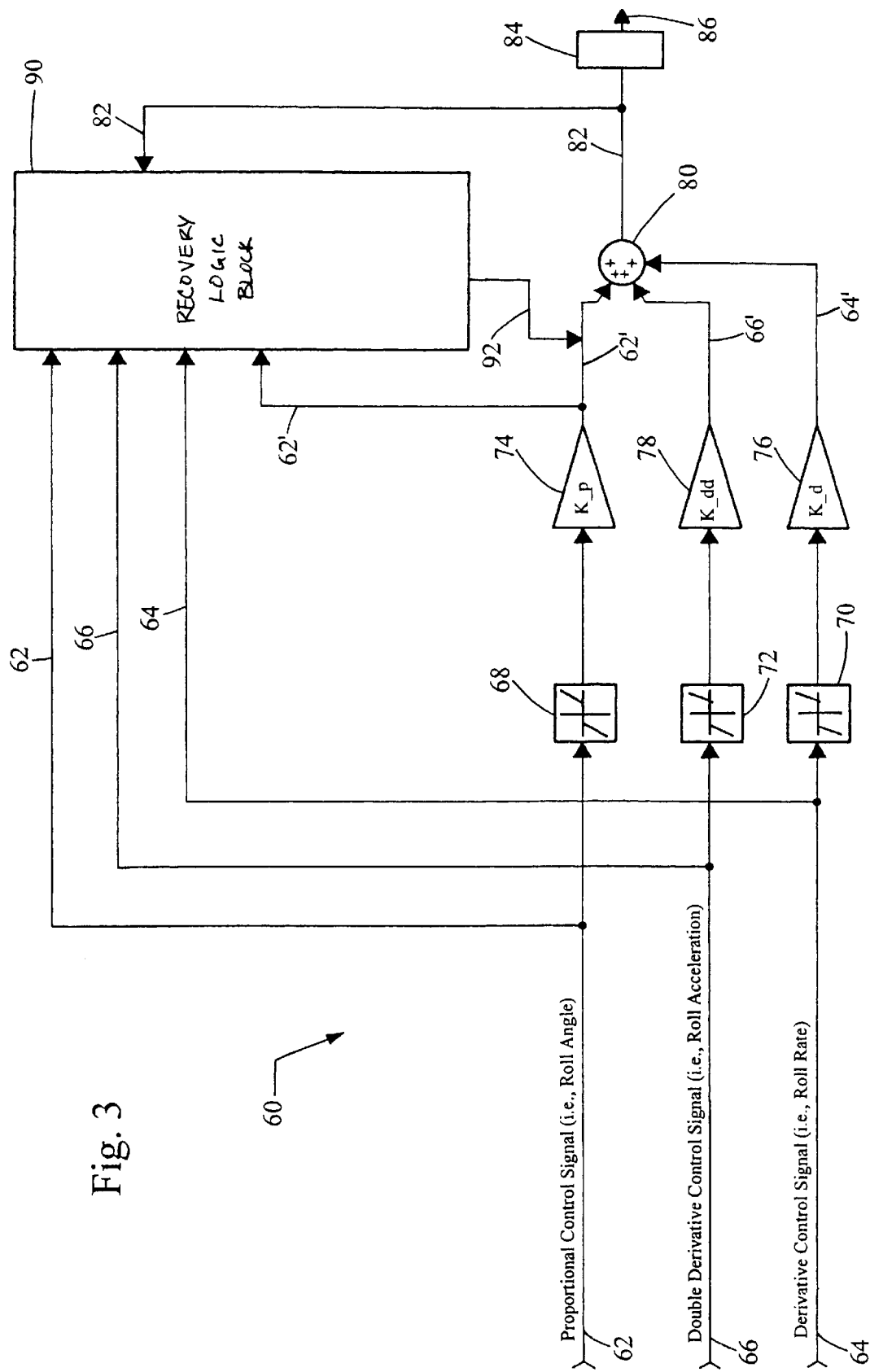
FIG. 3 is a flow chart depicting the application of a limited recovery rate in a stability control system.

Turning now to FIG. 3, a logic flow chart has been depicted for a stability control program, and in particular a roll stability program 60. Generally, the stability control system 60 changes the tire force vector based on at least one control signal. The depicted system 60 includes three control signals; namely a proportional control signal 62, a derivative control signal 64, and a double derivative control signal 66. More specifically, the proportional control signal represents the vehicle's roll angle which is typically estimated from available sensors, as is known in the art. The derivative control signal represents the vehicle's roll rate, which is directly measured from a sensor. Similarly, the double derivative control signal 66 represents the vehicle's roll acceleration which is also a measured value from existing sensors.

Briefly, these control signals 62, 64, 66 are individually run through deadbands 68, 70, 72, respectively. The deadbands 68, 70, 72 ensure the signals are above a predetermined threshold. Then the control signals 62, 64, 66 each pass through a gain denoted by blocks 74, 76, 78. In essence, the dead bands 68, 70, 72 and gains 74, 76, 78 act as timing variables which allow the control signals 62, 64, 66 to be utilized by the control system 60. The resultant control signals 62', 64', 66' are then summed by summer 80, which in turn sends a system request signal 82 to a calculation block 84. Block 84 calculates a desired brake force and/or a desired tire steer angle which is sent to the appropriate control system such as a brake control system or steering control system in the form of a control input 86.

Unfortunately, once the roll motion (or yaw motion) is stabilized, the reduction in the tire force vector $F_{y*}$ is not returned to an unmodified state in a controlled way. The result is that the magnitude of the lateral component of the tire force vector that had been removed, as described in FIGS. 1a–b, 2a–b is rapidly increased. The lateral force increase acts as a subtle trip, thereby inducing a rapid body roll movement in the vehicle, denoted by a high roll rate and momentum. Accordingly, the present invention provides a recovery logic block 90 which is utilized to control the, recovery of this lateral force component $F_{y*}$. Specifically, the recovery logic block 90 receives the proportional control signal 62, the derivative control signal 64, and the double derivative control signal 66. Further, the recovery logic block 90 receives the modified proportional control signal 62' and the system request signal 82. The recovery logic block 90 identifies when and how the limited recovery rate should be applied based on these signals.

The identification of when and how the limited recovery rate should be applied is based on available inputs. These inputs typically include the roll angle, roll rate and roll acceleration discussed above, as well as wheel speed and yaw rate of the vehicle. Additionally, the inputs can include inferred brake force, inferred tire lateral force, inferred tire steer angle, inferred roll angle, and inferred roll rate. The brake force can be inferred from a brake pressure estimate or brake pressure measured from a sensor. The tire lateral force can be inferred via estimates or measurements from an accelerometer or other sensor types. The inferred tire steer angle can be determined via an estimate or measurement of properties from which a tire steer angle can be calculated. The roll angle can be inferred via an estimate or measurement from which a roll angle can be calculated. The roll rate can be inferred via an estimate or measured properties from which a roll rate can be calculated, or a roll angle inferred in a derivative calculated.

When it has been determined that the recovery rate of the lateral force component should be controlled, the recovery logic block 90 will issue a interrupt signal 92 which replaces the modified proportional control signal 62' before it reaches summer 80. Accordingly, summer 80 will work with the interrupt signal 92 and the remaining control signals 64', 66' for sending the system request signal 82. In this way, the recovery logic block 90 can be utilized to control the system request signal 82 as necessary to limit the return of the lateral force component.

It will be recognized that the recovery logic block 90 can also issue an override signal directly to the summer 80. The override signal will be summed with the proportional control signal 62', derivative control signal 64' and double derivative control signal 66' to regulate the system request signal 82 which is outputted by the summer 80.

Figure 4:
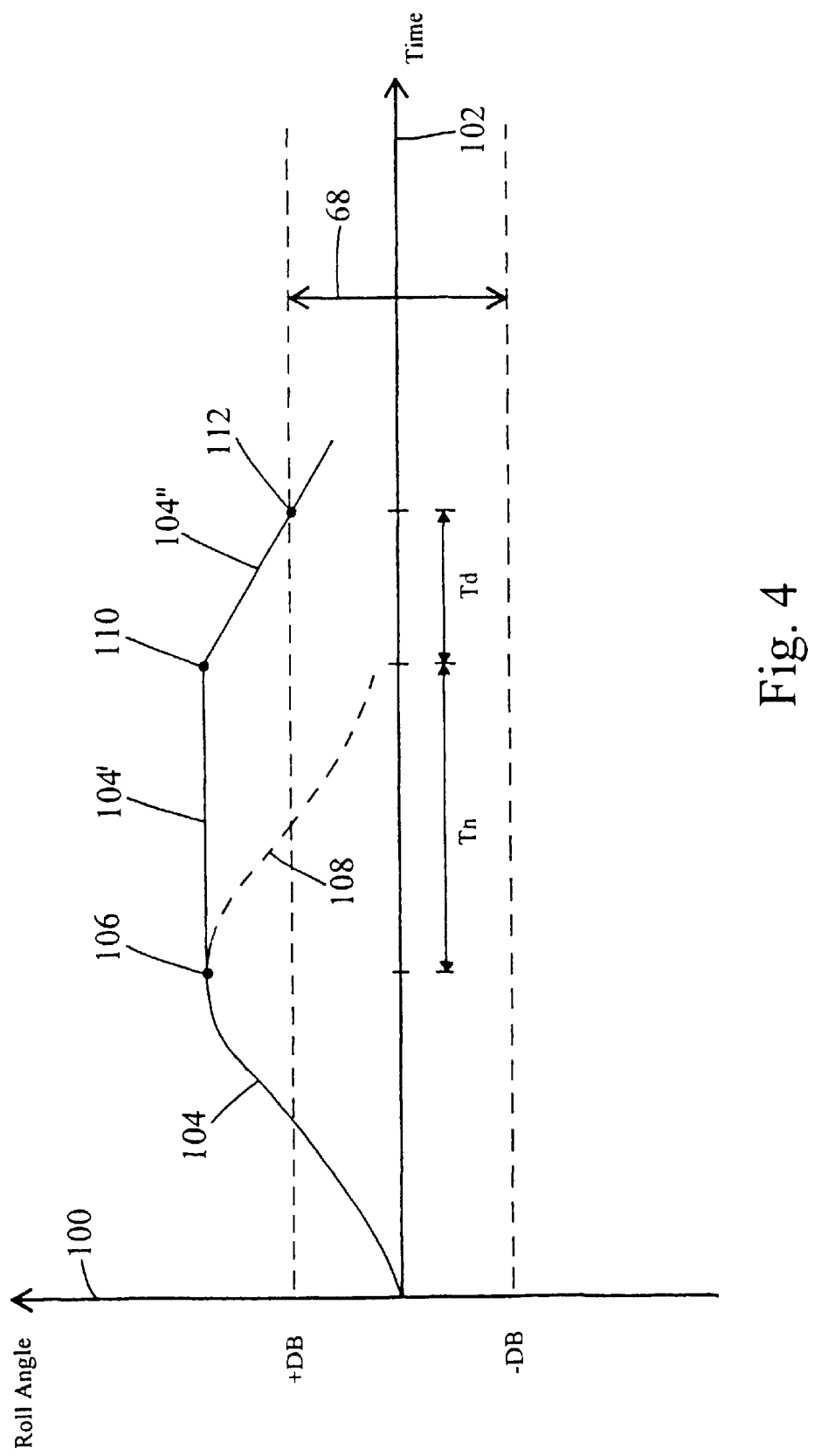
FIG. 4 is a graph showing roll angle over time and the effects of a limited recovery rate described in FIG. 3.

Accordingly, as shown in FIG. 4, the control input 86 is regulated by the recovery logic block 90 when the proper conditions exist. As a result, the return of the lateral force component is made in a controlled manner. As shown in the graph of FIG. 4, the roll angle variable is along a Y axis 100 and the time variable is along an X axis 102. The line 104 represents the proportional control signal (i.e., the roll angle 62) at any given point in time. The recovery logic block 90 identifies when the roll angle signal 104 has reached its peak as denoted by point 106. If left untouched, the roll angle signal 104 would typically return in unmodified manner as shown in dashed line 108. Rather, the recovery logic block 90 holds the roll angle control signal at its peak as denoted by line 104'. This is done for a predetermined period of time $T_h$, which is preferably greater than 100 milliseconds and most preferably around 500 milliseconds. After this time has expired, as denoted by point 110, the recovery logic block 90 steadily controls the decrease of roll angle control signal as denoted by line 104" until it crosses the deadband threshold as denoted by point 112. This controlled decrease in the roll angle signal, as shown by line 104''', occurs over a second predetermined time period $T_d$, which is preferably greater than 100 milliseconds and most preferably about 300 milliseconds.

In this manner, the recovery logic block 90 regulates the control input 86 to limit the recovery of the lateral force component on the particular wheel or wheels modified by the stability control system 60. In short, the control signal is interrupted to modify the system request signal 82, which in turn determines the control input 86 sent to the brake or steering control system. It will be also recognized that numerous modifications can be made to the controlled return of this lateral force. For example, the control input 86 need not be held at its peak, but rather can be slowly ramped down in a controlled manner as shown by line 104'''. Preferably, the controlled return (line 104'') is always applied when the stability control system 60 has modified the tire force vector. However, the recovery logic block 90 will apply a "peak hold" (line 104') only when certain inputs reach predetermined thresholds indicating a potential for unstable impulse forces, those inputs typically being the roll angle and roll rate, although other inputs can be employed (i.e. wheel speed and yaw rate) as described earlier.

Accordingly, the present invention provides a stability control system and method which returns the tire force vector at a limited rate to prevent an impulse force on the wheel, thereby increasing the stability of the vehicle. Typically, the control system will rely on at least a proportional control signal, and the present invention provides a logic block for either interrupting or overriding the proportional control signal, as well as any other signals which may be utilized in the stability control calculation. Preferably, the control input request sent by the stability control system is held at a maximum value for a first predetermined amount of time, and then returned at a limited rate over a second predetermined period of time. The controlled return of lateral force on the wheel prevents a strong lateral force that is impulsed on the wheel, and results in greater vehicle stability.

The present invention limits the rate of recovery of the lateral component of the tire force vector after a dynamic maneuver such as a hard turn or slalom maneuver which generates a larger amount of roll in the vehicle. Typically, the stability control program whether a roll stability program or a yaw stability program, decreases a wheel speed by applying a braking force, or by reducing the torque sent to that wheel. Alternately, the steering angle of the wheel can be adjusted based on available inputs. Accordingly, the present invention limits the lateral force recovery rate by limiting the rate of longitudinal wheel slip recovery by increasing, holding and/or reducing the total wheel movement via adjustment of the brake caliper pressure or drive torque based on available inputs. Further, the lateral force recovery rate can be limited by limiting the rate at which the steering angle of the wheel is adjusted based on available inputs.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for controlling stability in a vehicle comprising the steps of:
   recognizing a propensity for vehicle instability;
   modifying the tire force vector of a wheel of the vehicle from a first unmodified state to a modified state to increase stability; and
   returning the tire force vector from the modified state to a second unmodified state over an extended period of time to limit the rate of return and prevent an impulse force on the wheel.

2. The method of claim 1, further comprising the step of holding the tire force vector in the modified state when the propensity for vehicle instability is no longer recognized.

3. The method of claim 1, wherein the extended period of time is greater than 100 milliseconds.

4. The method of claim 1, wherein the step of modifying the tire force vector is based on a proportional control signal.

5. The method of claim 4, wherein the step of returning the tire force vector includes sending an interrupt signal that replaces the proportional control signal.

6. The method of claim 4, wherein the step of returning the tire force vector includes sending an override signal that is summed with the proportional control signal.

7. The method of claim 4, wherein the proportional control signal is roll angle of the vehicle.

8. The method of claim 4, wherein the proportional control signal is yaw rate error.

9. The method of claim 1, wherein the step of modifying is based on a proportional control signal, a derivative control signal, and a double derivative control signal.

10. The method of claim 9, wherein the proportional control signal is roll angle of the vehicle, the derivative control signal is roll rate of the vehicle, and the double derivative control signal is roll acceleration of the vehicle.

11. The method of claim 9, wherein the proportional control signal is yaw rate error of the vehicle, and the derivative control signal is the derivative of yaw rate error.

12. The method of claim 1, further comprising the step of determining a propensity for the impulse force on the wheel based on roll angle and roll rate of the vehicle.

13. The method of claim 12, wherein the step of determining a propensity for the impulse force on the wheel based on wheel speed and yaw rate.

14. A method for controlling stability in a vehicle comprising the steps of:
  recognizing a propensity for vehicle instability;
  reducing the lateral force on a wheel of the vehicle to increase stability by sending a request signal of a desired control input; and
  controlling the rate of return of the lateral force on the wheel by modifying the request signal of a desired control input.

15. The method of claim 14, wherein step of recognizing a propensity for vehicle instability includes monitoring a proportional control signal.

16. The method of claim 15, wherein the step of controlling the rate includes sending an interrupt signal that replaces the proportional control signal.

17. The method of claim 15, wherein the step of controlling the rate includes sending an override signal that is summed with the proportional control signal.

18. The method of claim 14, wherein the step of controlling the rate includes not returning the lateral force on the wheel for a first predetermined amount of time.

19. The method of claim 14, wherein the step of controlling the rate includes returning the lateral force on the wheel at a predetermined rate over a second predetermined amount of time.

20. The method of claim 14, wherein the reduction of lateral force on the wheel is held for a first predetermined amount of time and then ramped down for a second predetermined amount of time during the step of controlling the return of lateral force to the wheel.

21. The method of claim 14, wherein the step of controlling return of lateral force includes holding the request signal for a first predetermined amount of time, and then gradually reducing the request signal over a second predetermined period of time.

* * * * *